OR 3,951,514

United States Patent [19]
Medina, Jr.

[11] 3,951,514
[45] Apr. 20, 1976

[54] CONNECTOR MEMBER
[75] Inventor: Jose M. Medina, Jr., Whittier, Calif.
[73] Assignee: International Telephone and Telegraph Corporation, New York, N.Y.
[22] Filed: Dec. 23, 1974
[21] Appl. No.: 535,290

[52] U.S. Cl. .................. 350/96 C; 339/64 M; 339/136 M
[51] Int. Cl.² ............... G02B 5/16; H01R 13/46
[58] Field of Search ............ 339/59 M, 64 R, 64 M, 339/92 R, 92 M, 136 R, 136 C, 136 M; 350/96 C

[56] References Cited
UNITED STATES PATENTS

| | | | |
|---|---|---|---|
| 2,563,712 | 8/1951 | Frei et al. | 339/136 M X |
| 2,566,993 | 9/1951 | Parsons | 339/136 R X |
| 3,076,168 | 1/1963 | Keen | 339/92 M X |
| 3,088,089 | 4/1963 | Gregoire | 339/64 M X |
| 3,671,921 | 6/1972 | Baker et al. | 339/59 M |
| 3,731,258 | 5/1973 | Spicer | 339/92 M X |
| 3,864,018 | 2/1975 | Miller | 350/96 C |

Primary Examiner—Joseph H. McGlynn
Assistant Examiner—Howard N. Goldberg
Attorney, Agent, or Firm—Thomas L. Peterson

[57] ABSTRACT

A fiber optic connector member having a removable front insulator for protecting the faces of fiber optic bundles mounted within the connector. The insulator is retained within the connector shell by resilient retention fingers. An elongated slot extends through the insulator. An extraction tool is provided for releasing the retention fingers. The tool embodies a pulling element that extends through the slot in the insulator to allow the insulator to be withdrawn from the connector shell without damaging the fiber optic elements therein.

10 Claims, 7 Drawing Figures

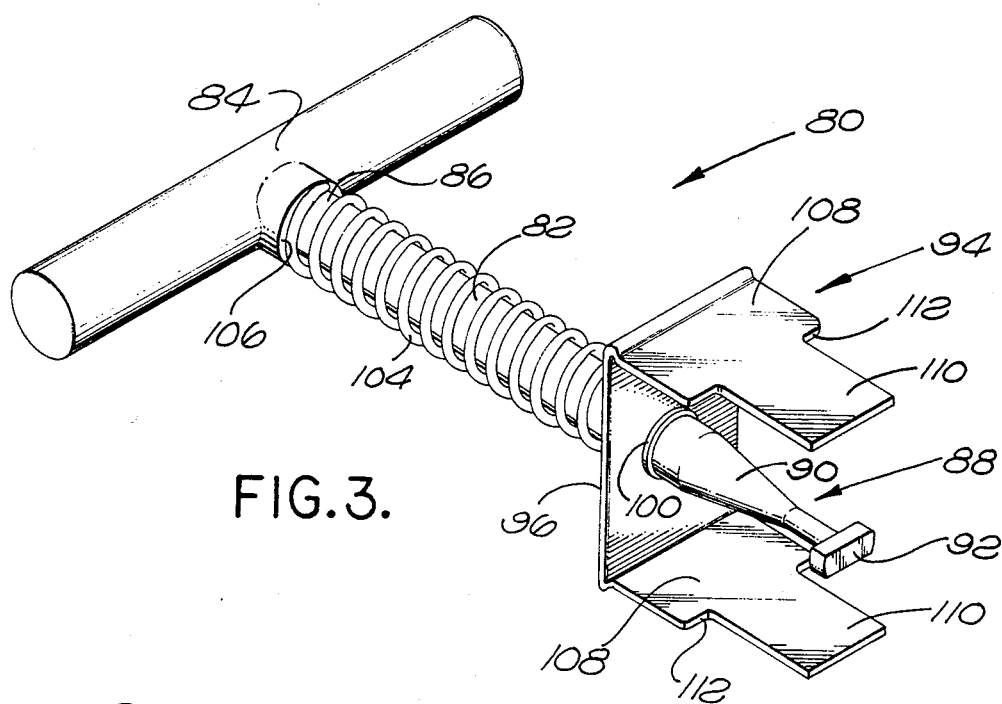
FIG.3.
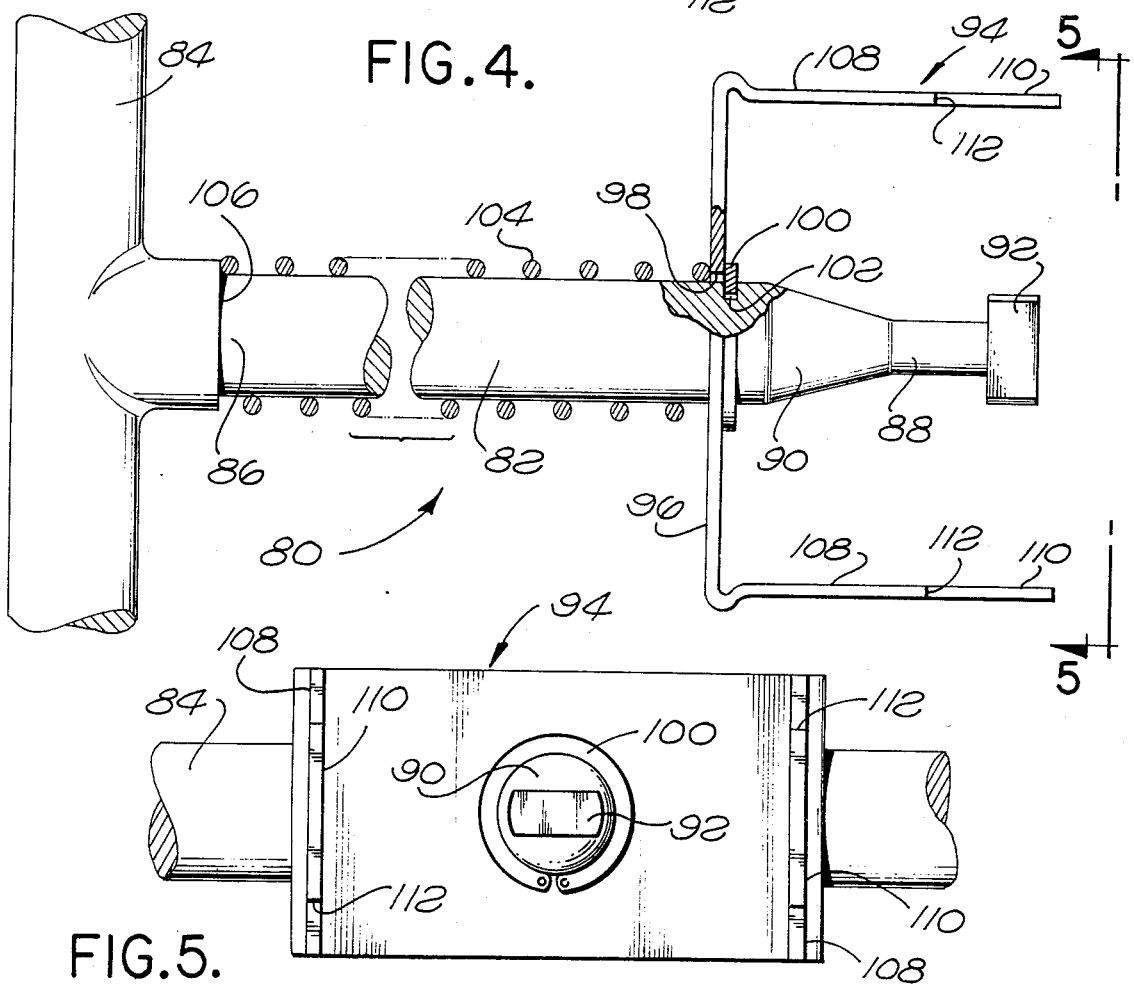
FIG.4.
FIG.5.

CONNECTOR MEMBER

BACKGROUND OF THE INVENTION

This invention relates generally to a connector member and, more particularly, to a fiber optic connector member having a removable front insulator, and to an extraction tool for releasing and withdrawing the insulator from the connector shell.

In a fiber optic connector it is desirable to provide a front insulator within the connector shell which protects the termination pins that terminate the fiber optic bundles mounted in the connector, yet is removable so that the faces of the fiber bundles can be cleaned periodically in the field while the connector is in use. The front insulator is retained in the connector shell by means of suitable resilient retention fingers on opposite sides of the shell. These fingers must be released in order to allow the front insulator to be removed from the shell. Likewise, some means is required to grip the front insulator in a positive fashion so that it can be readily withdrawn from the shell, without damaging either the insulator or the termination pins in the connector. It is the purpose of the present invention to construct the connector in such a manner that the front insulator may be removed in the field and to provide a tool which may be easily manupilated to release the retention fingers in the connector shell and positively engage the front insulator so that it may be withdrawn from the shell while the retention fingers are released by the tool.

SUMMARY OF THE INVENTION

According to the principal aspect of the present invention, a connector of the type previously described herein is formed with an elongated slot which extends from the forward face of the removable front insulator that protects the contact elements in the connector to a rearwardly facing surface thereon. Clearance spaces are provided between the inner surface of the connector shell and the outer surface of the front insulator, extending from the front face of the insulator to rearwardly facing shoulders thereon which are engaged by the retention fingers mounted in the shell. An extraction tool is provided which comprises a shaft having a handle mounted on the rear end thereof and a transversely extending arm on the forward end of the shaft. The arm is dimensioned so as to be slidable within the elongated slot in the front insulator of the connector. In addition, an element is rotatably mounted adjacent to the forward end of the shaft. This element is formed with a pair of forwardly extending legs which are generally parallel to and spaced from the shaft. The distance between the legs and shaft corresponds to the distance between the elongated slot in the front insulator of the connector and the retention fingers mounted in the shell that retain the insulator therein. The tool is inserted into the connector member with the transversely extending arm sliding through the elongated slot in the front insulator and the forwardly extending legs on the rotatable element of the tool extending into the clearance spaces to lift the retention fingers out of engagement with their cooperating retention shoulders on the front insulator to thereby release the fingers, leaving the insulator free floating in the shell. The handle of the tool is then rotated approximately 90° so that the transversely extending arm on the forward end of the tool will engage a rearwardly facing suface on the insulator. The tool is then withdrawn from the connector shell to extract the insulator therefrom. Thus, a single tool is utilized to release the retention fingers and withdraw the front insulator from the connector shell without damaging the pins that terminate the fiber bundles within the connector, thereby allowing the faces of the fiber bundles to be easily cleaned in the field.

BRIEF DESCRIPTION OF THE DRAWINGS

FIG. 3 is a perspective view of the extraction tool of the present invention;

FIG. 4 is a fragmentary side elevation of the extraction tool illustrated in FIG. 3, with a portion shown in longitudinal section;

FIG. 5 is a front view of the tool illustrated in FIGS. 3 and 4;

DESCRIPTION OF THE PREFERRED EMBODIMENT

Figure 1:
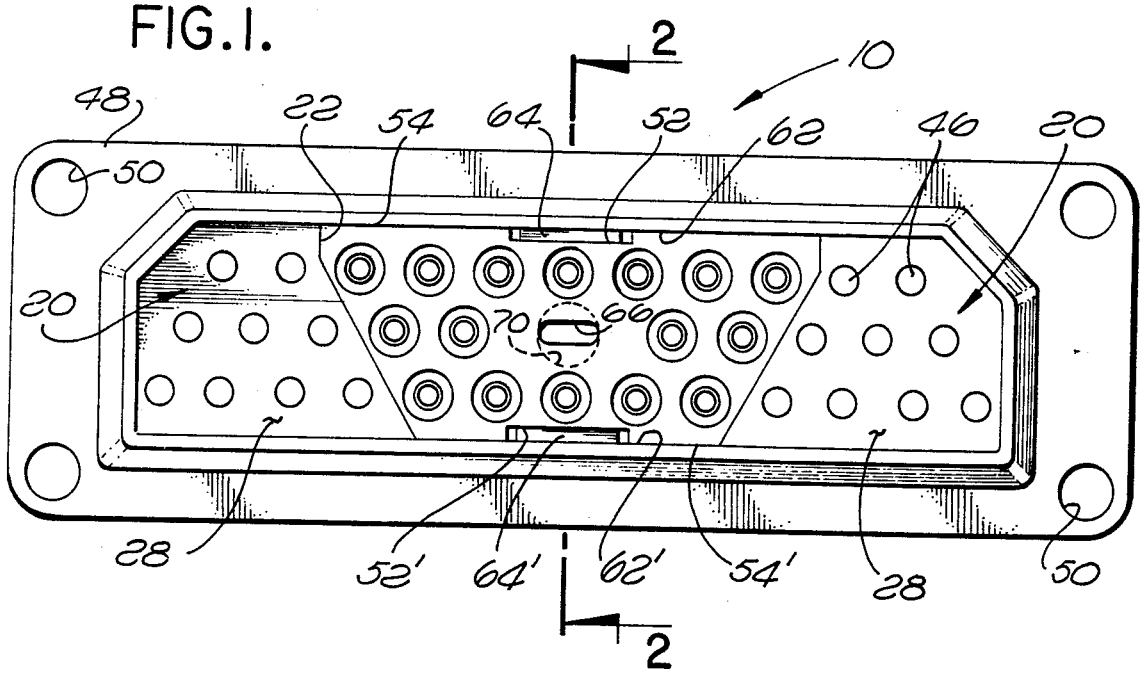
FIG. 1 is a front elevational view of a connector constructed in accordance with the present invention.
Figure 2:
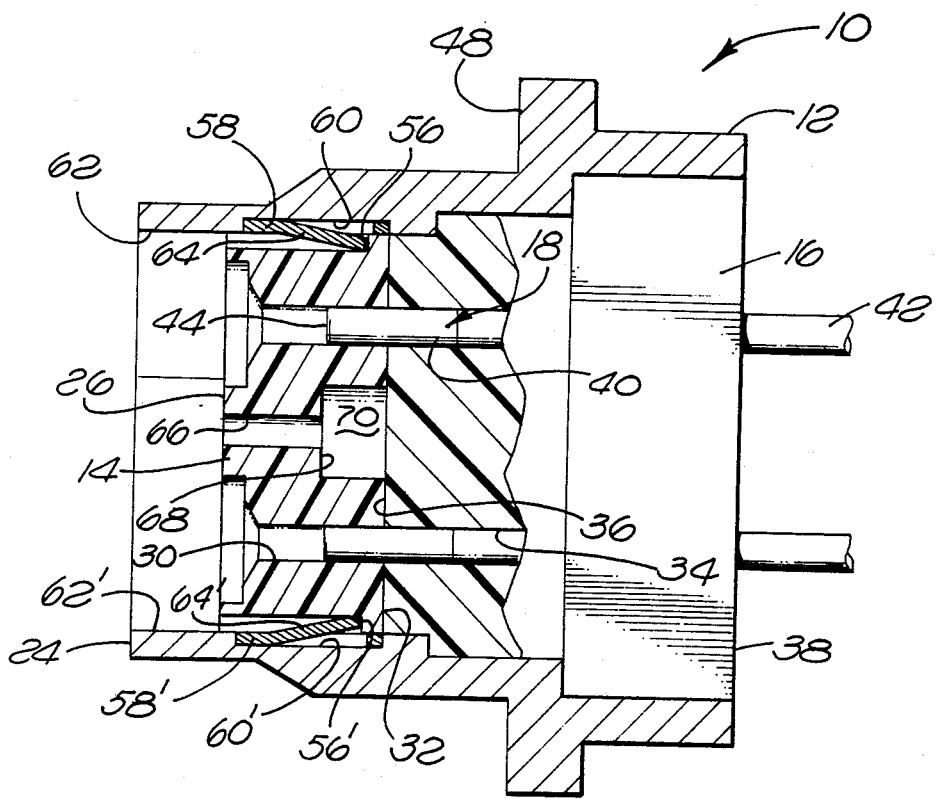
FIG. 2 is a partial vertical sectional view taken along line 2—2 of FIG. 1 showing how the retention fingers retain the front insulator within the connector shell.

Referring now to FIGS. 1 and 2 in detail, there is illustrated the connector of the present invention, generally designated 10. The connector comprises a hollow generally rectangular shell 12 which contains a front support member 14 and a rear support member 16 containing conductive elements 18. The present invention is particularly adapted to a fiber optic connector in which the conductive elements 18 contain optical fibers. This being the case, the front and rear support members 14 and 16 may be formed of either insulation material or conductive material. It is advantageous, however, that the support members be formed of insulation, such as rubber or plastic, for ease of manufacture and to minimize cost and weight. Consequently, throughout the specification the members 14 and 16 will hereinafter be referred to as the front and rear insulators of the connector. Needless to say, if the conductive elements 18 were electrical contacts, then the members 14 and 16 must be formed of electrically nonconductive material. While the invention is particularly advantageous for a fiber optic connector, it will be appreciated from the following description that the invention could also be advantageously adapted to a connector containing only electrical contact members if it is necessary or desirable to have a removable front insulator therefor.

The rear insulator 16 is fixedly mounted within the shell 12. As seen in FIG. 1, the rear insulator has forwardly extending side portions 20 adjacent to the opposite ends of the shell 12 defining a recess 22 therebetween of generally trapezoidal configuration. The front insulator 14 has a configuration complementary to the recess 22 and is slidable from the forward end 24 of the shell into such recess. When the front insulator is fully mounted in the recess 22, the forward face 26 of the front insulator is flush with the front faces 28 of the side portions 20 of the rear fixed insulator.

The front insulator 14 is formed with a plurality of passages 30 which extend from the forward face 26 to the rear face 32 of the insulator. Passages 34 are provided in the rear insulator 16 which extend from the forward face 36 thereof to the rear face 38 and in alignment with the passages 30 in the front insulator. The conductive elements 18 are mounted in the passages 30 and 34. Each conductive element 18 comprises a metallic termination pin or contact 40 which terminates a fiber optic bundle 42 that extends rearwardly through the passage 34 in the rear insulator. The optical fibers in the bundle 42 terminate in a polished end surface at the forward end 44 of the termination pin 40. The end 44 of the pin is located within the passage 30 in the front insulator intermediate the forward face 26 and the rear face 32 of the insulator. Thus, the front insulator provides protection for the polished forward end 44 of the optical fibers in the termination pin 40. When the connector member 10 is connected to a mating connector member, not shown, termination pins in the mating connector member similar to the pins 40 will extend into the forward ends of the passages 30 to bring the faces of the pins into abutting relationship for maximum light transmission through the fiber optic bundles of the two connector members. The conductive elements 18 may be mounted in the connector 10 in any suitable manner. For example, the elements may be releasably mounted in the rear insulator by means of circular releasable retention clips, not shown, such as disclosed in U.S. Pat. No. 3,158,424 to Bowen.

The rear fixed insulator 16 may also contain a plurality of electrical contacts 46 which are disposed in the side portions 20 of the insulator. Alternatively, all the contacts in the connector member 10 may comprise fiber optic contacts, as illustrated in FIG. 2 in which case the front insulator 14 would completely cover the face of the rear insulator.

The connector shell 12 is formed with an outwardly extending flange 48 containing a plurality of openings 50 for receiving fasteners to mount the connector to a suitable panel, not shown.

A slot 52 is formed in the top surface 54 of the front removable insulator 14. The slot extends from the forward face 26 of the insulator rearwardly to a forwardly facing shoulder 56 adjacent to the rear face 32 of the insulator. A second slot 52' is formed in the bottom surface 54' of the front insulator similar to the slot 52. The slot 52' extends to a forwardly facing shoulder 56'. It is noted from FIG. 1 that the slots 52 and 52' are in vertical alignment with each other and generally centrally positioned with respect to the connector. A retention clip 58 is mounted in a recess 60 formed in the top inner surface 62 of the shell 12. A similar retention clip 58' is mounted in a recess 60' in the bottom inner surface 62' of the shell. The retention clips 58 and 58' are aligned with the slots 52 and 52'. The retention clips embody resilient rearwardly and inwardly extending retention fingers 64, 64' which engage the respective shoulders 56, 56' on the front insulator limiting forward movement of the insulator within the shell 12. It will be appreciated that the width of the slots 52, 52' are sufficiently great to allow the retention finger 64, 64' to extend thereinto to engage the forwardly facing shoulders on the front insulator. It is further seen that the slots 52, 52' provide clearance spaces between the front insulator and the inner surface of the shell 12 allowing a tool to be inserted thereinto to engage the retention fingers, lifting the fingers out of engagement with the shoulders 56, 56', thereby allowing the front insulator to be withdrawn forwardly from the connector shell.

The front insulator 14 is formed with a centrally positioned elongated slot 66 which extends from the forward face 26 of the insulator to the bottom 68 of a cylindrical recess 70 formed in the rear face 32 of the insulator. As best seen in FIG. 1, the elongated slot 66 is disposed horizontally, and the diameter of the recess 70 is substantially the same as the length of the slot 66.

Reference is now made to FIGS. 3–5 which illustrate the extraction tool of the present invention, generally designated 80. The tool comprises a cylindrical shaft 82 having a handle 84 fixedly mounted on the rear end 86 of the shaft. The forward end 88 of the shaft is of reduced diameter, and is joined to the larger diameter main section of the shaft by a tapered transitional region 90. An arm 92 extends transversely across the terminal forward end of the shaft 82. The arm has a configuration complementary to that of the slot 66 in the front insulator. In addition, the diameter of the forward reduced end section 88 of the shaft is slightly less than the width of the slot 66. Hence, the forward end of the tool with the transversely extending arm 92 is slidable within the slot 66.

Figure 6:
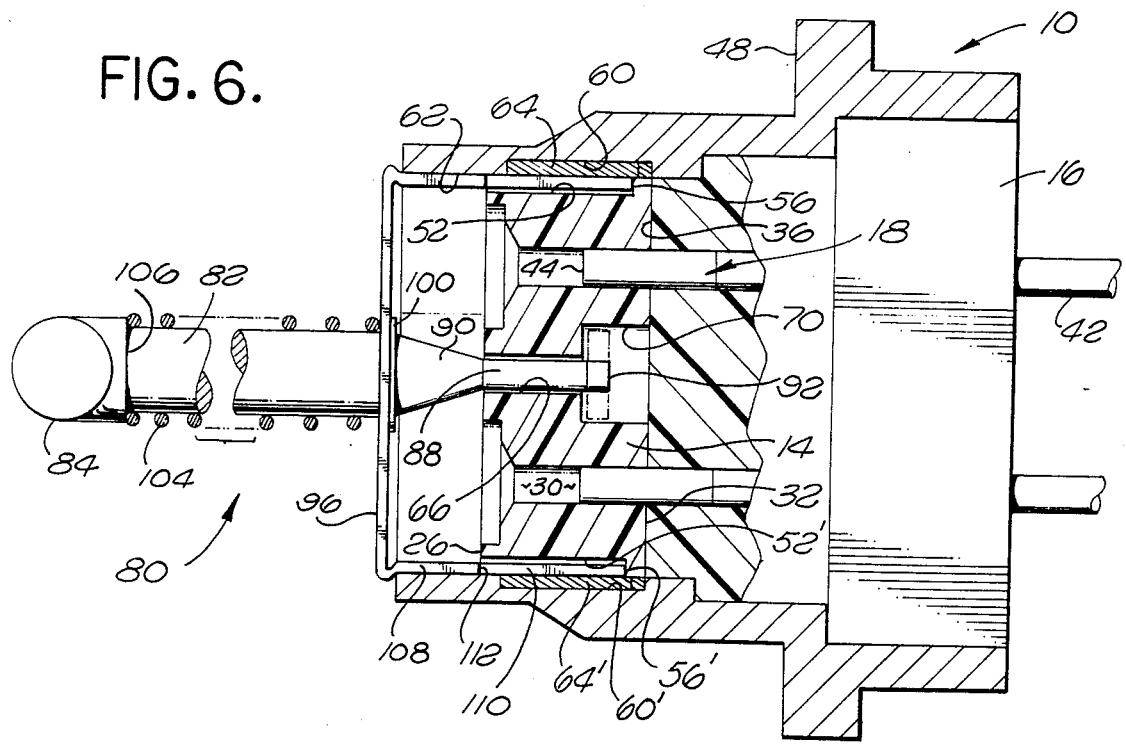
FIG. 6 is a partial sectional view similar to FIG. 2 showing the tool of FIGS. 3–5 inserted within the connector to release the retention fingers therein.

A U-shaped element 94 is rotatably mounted adjacent to the forward end of the shaft 82. The element 94 includes a transversely extending base 96 having an opening 98 therein which rotatably receives the shaft 82. A retaining ring 100 is mounted in an annular groove 102 in the shaft in front of the element 94 to retain the element on the shaft. A coil spring 104 surrounding the shaft 82 extends from an annular shoulder 106 on the handle to the rear surface of the base portion 96 of the element 94, thereby biasing the element forwardly on the shaft against the retaining ring 100. The leg portions 108 of the U-shaped element 94 are generally flat and parallel to each other. These leg portions extend forwardly and terminate substantially at the forward end of the shaft where the arm 92 is located. The forward portions 110 of the legs are reduced in width, to define forwardly facing shoulders 112. The width of the forward portions 110 of the legs is slightly less than the width of the slots 52, 52' so that the legs may slide into such slots. The thickness of the forward portions 110 of the legs is such that when the legs are inserted into the slots 52, 52', they will lift the retention fingers 64, 64' out of engagement with the shoulders 56, 56' on the front insulator, such as seen in FIG. 6. The distance between the legs 108 and the arm 92 on shaft 82 corresponds to the distance between the slots 52, 52' and the slot 66 in the front insulator of the connector.

To release and remove the front insulator 14 from the connector shell 12, the forward end of the tool 80 is inserted into the shell with the arm 92 on the end of the shaft extending horizontally, corresponding to the disposition of the slot 96 in the front insulator. As the tool is moved forward into the shell, the forward portions 110 of the legs 108 slide into the slots 52, 52' until the shoulders 112 engage the forward face 26 of the front insulator. The legs will then engage under the retention fingers 64, 64', releasing the fingers from engagement with the shoulders 56, 56' on the insulator, thereby releasing the insulator from the shell so that it is free floating and therefore can be removed. As the tool is moved forward into the shell, the tapered transitional section 90 of the shaft bottoms out against the front face 26 of the insulator. In this position of the tool, the transversely extending arm 92 on the end of the shaft is located within the recess 40 in the insulator. As a consequence, the handle 84 may be rotated 90° so that the arm extends vertically, as illustrated in FIG. 4, and also in dotted lines in FIG. 6, so that the arm is now positioned so that its end will engage against the bottom 68 of the recess 40. A forward pulling motion is then applied to the tool to withdraw the insulator from the shell 12 as seen in FIG. 7.

Figure 7:
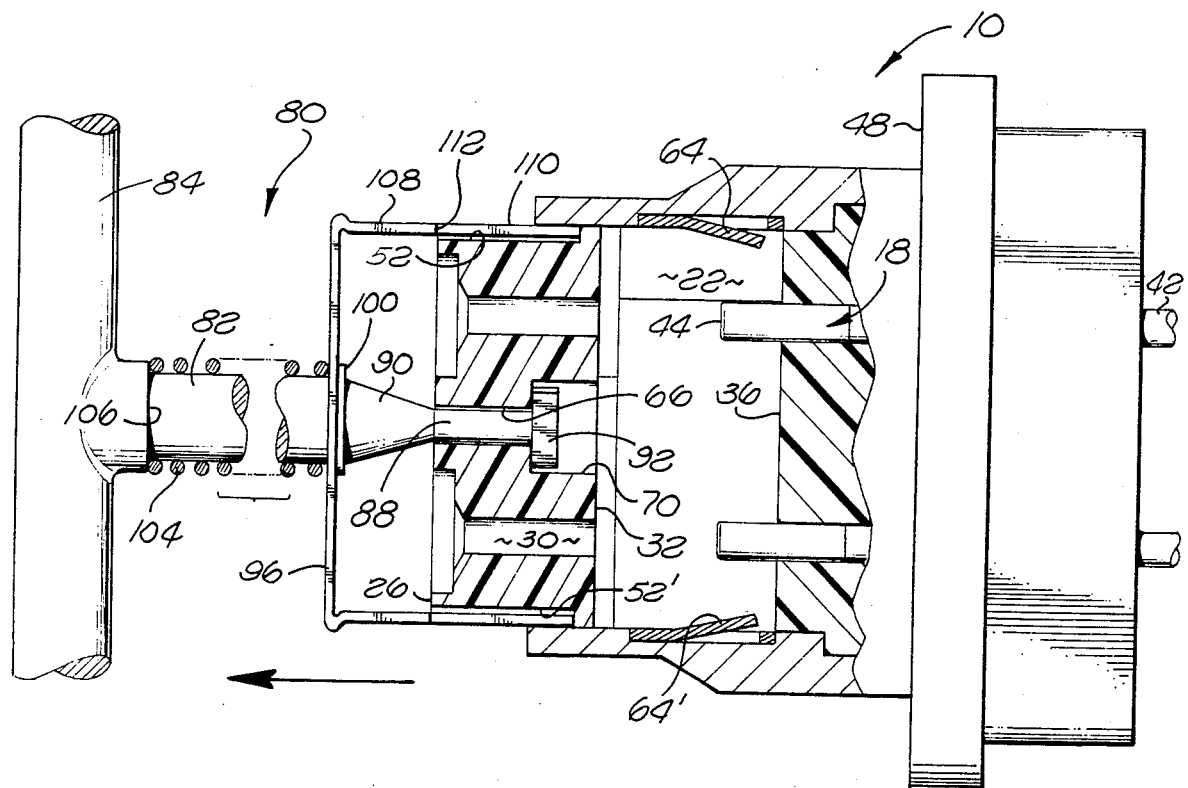
FIG. 7 is a partial sectional view similar to FIG. 6 but showing the front insulator withdrawn from the connector shell by the tool.

The tool and connector member are suitably dimensioned so that the arm 92 will not extend into the recess 40 allowing the tool to be rotated from the position shown in FIG. 6 to that shown in FIG. 7 until the legs 110 of the tool are fully positioned to release the retention fingers in the shell. The spring mounting of the U-shaped element 92 on the tool 80 accomodates any tolerance buildup between the tool and the connector member 10, and also assures that a continuous spring force is applied to the U-shaped element so that the retention clips 58 will remain released even when the tool is rotated and pulled forwardly to withdraw the front insulator from the connector shell.

Thus, it will be appreciated that by the present invention there is provided a tool of very simple construction, which is easy to manipulate and allows the release of the retention fingers in the connector shell and the positive withdrawal of the front insulator from the shell without causing any damage to either the shell, the insulator or the fiber optic contacts mounted within the connector. Obviously, minor modifications may be made in the tool 80 without departing from the spirit and scope of the invention. For example, the arm 92 needs only extend in one direction transversely from the axis of the shaft 82, rather than to opposite sides of the shaft as described hereinbefore. Moreover, the U-shaped element 94 need not be biased by the spring 104, but rather could be mounted against any axial movement on the shaft 82, if manufacturing tolerances are closely held to assure that the retention fingers in the shell are released when the arm 92 is rotated 90° to withdraw the front insulator from the shell. Also, while only one retention clip has been shown as being provided at the top and bottom of the shell 12, it will be appreciated that a greater number of such clips may be utilized, depending upon the width of the removable front insulator. With the addition of more retention clips, needless to say, the width of the legs 110 of the U-shaped element of the tool 80 must be sufficiently wide to engage under all the fingers to release the same when the tool is inserted into the connector shell. Other modifications and variations of the invention will be apparent to those skilled in the art.

What is claimed is:

1. A connector member comprising:
   a shell containing a rear fixed support member and a front support member slidably removable from the forward end of said shell;
   each said support member having a forward face and a rear face;
   a plurality of conductive elements mounted in said rear support member extending at least to said forward face thereof but terminating behind said forward face of said front support member;
   said shell having an inner surface;
   said front support member having a forwardly facing shoulder thereon adjacent to said shell inner surface and behind said forward end of said shell;
   said shell having at least one resilient retention finger extending inwardly and rearwardly from said inner surface thereof engaging said shoulder to limit forward movement of said front support member in said shell;
   means defining a clearance space between said shell inner surface and said front support member extending from said shoulder to said forward face of said front support member; and
   an elongated slot in said front support member extending rearwardly from said forward face thereof to a rearwardly facing surface on said front support member.

2. A connector as set forth in claim 1 wherein:
   said clearance space defining means comprises a slot in the outer surface of said front support member, said slot being wider than the width of said retention finger.

3. A connector as set forth in claim 1 including:
   a second one of said shoulders, retention fingers and clearance space defining means each disposed on the side of its respective shell and front support member opposite to said first mentioned shoulder, retention finger and clearance space defining means.

4. A connector as set forth in claim 1 including:
   a recess in said front support member aligned with said slot and opening at said rear face of said front support member, said slot opening at the bottom of said recess.

5. A connector as set forth in claim 4 wherein:
   the cross-section of said recess is greater than the width of said slot.

6. A connector as set forth in claim 4 wherein:
   said recess is cylindrical, the diameter of said recess being at least as great as the length of said slot.

7. A connector as set forth in claim 1 wherein:
   said conductive elements are optical fibers.

8. A connector member comprising:
   a generally rectangular shell containing a rear relatively fixed support member and a front support member slidably removable from the forward end of said shell;
   each said support member having a forward face and a rear face, said front support member having top and bottom surfaces;
   a plurality of conductive elements mounted in said rear support member extending at least to said forward face thereof but terminating behind said forward face of said front support member;
   said shell having top and bottom inner surfaces;
   said front support member having forwardly facing shoulders on said top and bottom surfaces thereof adjacent to said shell top and bottom inner surfaces and behind said forward end of said shell;
   said shell having at least one resilient retention finger extending inwardly and rearwardly from said top and bottom inner surfaces thereof engaging said shoulders to limit forward movement of said front support member in said shell;
   clearance slots in said top and bottom surfaces of said front support member extending from said shoulders to said forward face of said front support member; and
   an elongated slot in said front support member extending rearwardly from said forward face thereof to a rearwardly facing surface on said front support member.

9. In a connector member, the combination comprising:
- a shell having a support member slidably removable from the forward end of said shell;
- said support member having a forwardly facing shoulder thereon inside said shell, a forward face and a rear face, conductor receiving passages in said support member extending from said forward face to said rear face;
- said shell having a resilient retnetion finger extending inwardly and rearwardly from the inner surface of said shell engaging said shoulder to retain said support member within said shell;
- means defining a clearance space extending from said shoulder to said forward face of said support member; and
- an elongated, tool receiving slot in said support member in addition to said passages extending rearwardly from said forward face to a rearwardly facing surface on said support member.

10. A connector member as set forth in claim 9 including:
- a fiber optic bundle extending forwardly into each of said passages, each said bundle having a forward mating end terminating behind said forward face of said support member.

* * * * *